Aug. 5, 1924.
W. PFANNKUCH
1,503,998
PROTECTIVE SYSTEM
Filed Aug. 29, 1921    2 Sheets-Sheet 2
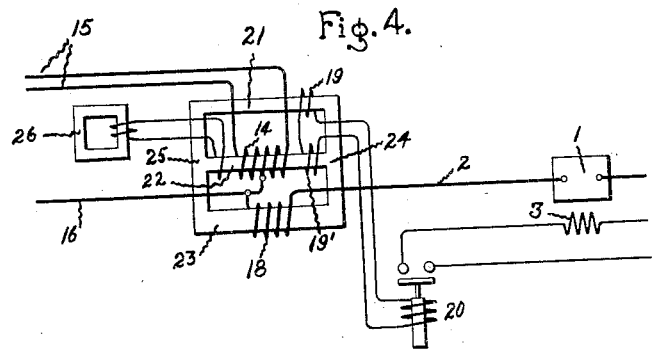
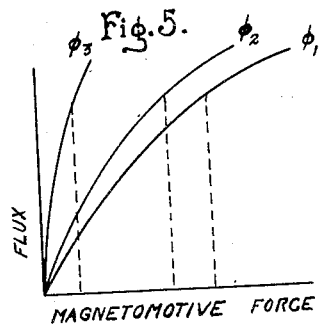
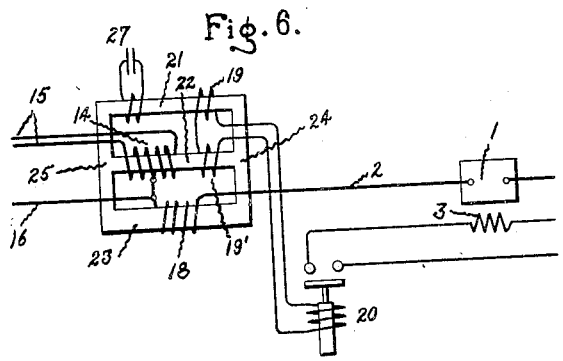
Inventor:
Wilhelm Pfannkuch,
by (signature)
His Attorney.

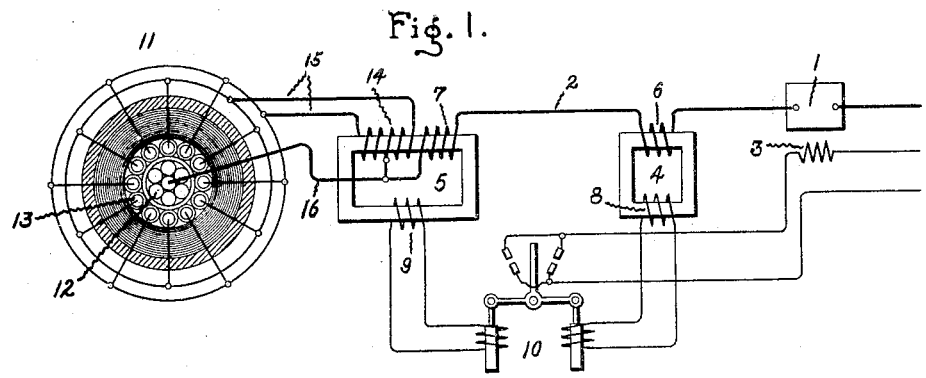
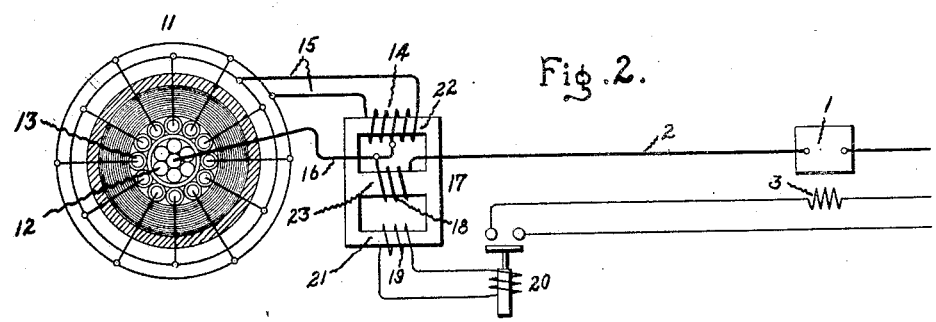
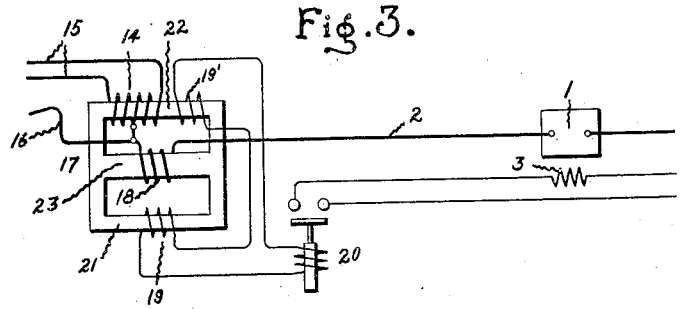

Patented Aug. 5, 1924.

1,503,998

UNITED STATES PATENT OFFICE.

WILHELM PFANNKUCH, OF BERLIN-NIEDERSCHONEWEIDE, GERMANY, ASSIGNOR TO GENERAL ELECTRIC COMPANY, A CORPORATION OF NEW YORK.

PROTECTIVE SYSTEM.

Application filed August 29, 1921. Serial No. 496,489.

(GRANTED UNDER THE PROVISIONS OF THE ACT OF MARCH 3, 1921, 41 STAT. L., 1313.)

*To all whom it may concern:*

Be it known that I, WILHELM PFANNKUCH, a citizen of Germany, residing at Berlin-Niederschoneweide, Germany, have invented certain new and useful Improvements in Protective Systems (for which I have filed applications in Germany, June 18, 1919, Pat. 334,861; Switzerland, June 2, 1920; Sweden, June 4, 1920; Holland, June 5, 1920; Norway, June 28, 1920; Italy, June 30, 1920; France, July 7, 1920; Denmark, August 11, 1920), of which the following is a specification.

My invention relates to improvements in protective systems for electric lines and for windings of electric machines and apparatus, and more particularly to protective systems of the type disclosed in my Letters Patent 1,161,723 of the United States, issued November 23, 1915, in which the outer section of the conductor to be protected consists of a plurality of wires only lightly insulated from each other and from the inner section of the conductor, and the outer wires or conductors, although carrying line current are, under working conditions, subjected to a moderate difference of potential by means of an auxiliary source of potential. If, in case of trouble, the weak insulation between the wires of the outer conductors or between one of these wires and the inner conductor break down or be destroyed, the auxiliary potential is intended to produce over the closed circuit or break down caused by the trouble, a current superimposed on the main current. This superimposed current may be used according to requirements, either for disconnecting the injured line section or for actuating suitable alarm or trouble indicating devices. The auxiliary potential may be supplied by the main current itself, that is to say by means of a current transformer fitted with an additional winding and connected in series with a current transformer of normal type. The changes in the working conditions of the first current transformer arising from the action of the superimposed current by comparison with the normal current transformer, may be indicated in a very simple manner or may be used to actuate electroresponsive devices arranged to control suitable circuit controlling or interrupting means in the line.

An object of my invention is to provide a protective system of this type in which the number of transformers is reduced and the arrangement of the system simplified and improved.

My invention will be better understood from the following description taken in connection with the accompanying drawings and its scope will be pointed out in the appended claims.

Fig. 1 illustrates diagrammatically a protective system of the type to which my invention is applicable, Fig. 2 illustrates an embodiment of my invention shown in single line diagram for clearness, Fig. 3 illustrates diagrammatically a modification of my invention, Fig. 4 illustrates diagrammatically another modification of my invention, Fig. 5 illustrates by characteristic curves the relations of the fluxes in the magnetic circuits of the transformer arrangement shown in Fig. 4, and Fig. 6 is a still further modification of my invention.

In order to facilitate the description of my invention, reference will first be had to Fig. 1 which illustrates a protective system of the type to which my invention is applicable. Fig. 1 illustrates a protective system comprising suitable circuit interrupting means 1 arranged to control the circuit of a conductor 2 and to be controlled by any suitable means such as a trip coil 3. A current transformer 4 of the usual type and a special current transformer 5 have their primary windings 6 and 7 respectively in series relation with the conductor 2. The currents in the secondaries 8 and 9 of the transformers 5 and 6 respectively are compared in any suitable manner for actuating alarm or indicating devices or electroresponsive means, such as a differential relay 10 arranged to control contacts in the control circuit of the trip coil 3. The main or line conductor 11 to be protected is shown as a cable comprising a plurality of conductor elements such as an inner conducting portion 12 and an outer conducting portion connected in parallel therewith and comprising conductors such as wires or conductors 13 lightly insulated from each other and the inner conducting portion. Alternate conductors of the outer conducting portion are connected in two groups or conductor elements which are connected to the terminals of an auxiliary winding 14 on the transformer 5 by the conductors 15 and the inner conducting portion 12 is connected to an intermediate point of winding 14 and to conductor 2 by a conductor 16. With this arrangement, the resultant magnetomotive force of the winding 14 produced by the currents flowing in the two outer groups of conductors is normally zero, but the flux set up by the primary winding 7 through which all the line conductor current flows will induce an electromotive force in the winding 14 so that there normally exists a moderate difference of potential between the outer conductor groups or elements and between each of these and the inner conductor element. Upon a break-down of insulation between the outer conductor groups or between either of these and the inner conductor, all or a portion of the winding 14 will be short circuited and there will result a current superimposed on the main or working current. This superimposed current will induce a flux tending to oppose the flux set up by the primary winding 7 and therefore effect a change in the electromotive force induced in the secondary winding 9. In consequence of this change, the balance of the currents in the secondaries 8 and 9 is disturbed and the relay 10 will operate to close its contacts, and thereby effect the tripping of the circuit interrupting means 1.

Fig. 2 illustrates diagrammatically an embodiment of my invention applicable to protective systems of the type illustrated in Fig. 1. According to my invention, I provide a protective transformer 17 comprising a plurality of magnetic circuits and having a primary winding 18 in circuit with conductor 2 and in common to two of the magnetic circuits. The transformer 17 is also provided with a secondary winding 19 comprising turns associated with at least one of the magnetic circuits and an auxiliary winding 14 associated with another of the magnetic circuits. The auxiliary winding 14 is connected to the two groups of the outer conducting portion and to the inner conducting portion of the cable 11 as heretofore described.

In circuit with the secondary winding 19 is an electroresponsive device, such as a relay 20 which may be arranged to control contacts in the control circuit of the trip coil 3 or to actuate suitable alarm or indicating devices. In this embodiment of my invention, the leg 21 of the transformer 17 may be considered as constituting a component part of the transformer 4 of Fig. 1, and the leg 22 of the transformer 17 may be considered a component part of the transformer 5 of Fig. 1, while the leg 23 together with the primary winding 18 may be considered a component part common to both the transformers 4 and 5 of Fig. 1. It is clearly evident, that in case of a breakdown of insulation between the two outer conductor groups or one of these and the inner conductor of the cable 11, all or part of the auxiliary winding 14 will be short circuited and will act to oppose the flux set up in the leg 22 by the primary winding 18 and more of the flux produced by the primary winding 18 is forced into the leg 21. Consequently this change in the distribution of the fluxes in the magnetic circuits comprising legs 21 and 22 will effect a change in the electromotive force induced in the secondary winding 19 and relay 20 will therefore operate to close its contacts in the control circuit of trip coil 3.

Assuming identical conditions, the energy actuating the relay is doubled in the arrangement shown in Fig. 2 as compared to the former arrangement shown in Fig. 1, and the sensitiveness of the protective arrangement is increased in the same ratio.

Under these conditions it may be admissible, sometimes, to dispense with a differentially connected secondary winding on the transformer 17 as already assumed in Fig. 2, as under any conditions, arrangements may be made to keep, while the system is free from trouble, the current flowing in the secondary winding 19 of smaller value than the limit value of the current in the relay. Nevertheless, the value of the current in the secondary winding 19 depends upon the value of the working current in the primary winding 18 and may exceed a certain value determined by the dimensions of the transformer sufficient to actuate the relay 20, even if no superimposed current due to an insulation failure is present in the secondary winding 19. In this embodiment of my invention, the protective arrangement, therefore, has its maximum effect and provides over-current protection in addition to protection against failure of insulation. This maximum effect may be avoided in accordance with my invention as shown in Figs. 3 and 4 by providing the transformer 17 with a differentially wound secondary winding comprising turns or fractional windings 19, 19' on the legs 21 and 22 connected and arranged for opposing balanced electromotive forces. With these arrangements, the winding of the relay 20 will be without current irrespective of the excitation of the primary winding 18, in so far as the characteristic features of the cores 21 and 22 remain constant in their relation at any excitation.

In view of the practical requirements in designing the protective current transformers and having regard to other conditions, it may be necessary to design cores of a construction in which the assumptions just mentioned may not hold good. In Fig. 4 for example, the same magnetomotive force obtains at the intersecting or branching off points 24 and 25 of the magnetic circuits comprising the legs or cores 21 and 22. The magnetic conductivity of the two circuits as referred to these final points, is, however, not equal under certain conditions, as a consequence of differences in section or length of the iron paths appertaining to cores 21 and 22. In the case represented, the magnetic resistance of the yoke pieces may prevent the flux in the core 21 from attaining the same value as in the core 22 as is intended in the present case with the sectional areas of the cores 21 and 22 of the same value. The relation of the flux curves of the cores 21 and 22 is illustrated in Fig. 5. In this figure, there is illustrated in the direction of the ordinates, the fluxes $\varphi_1$ and $\varphi_2$ pervading the cross section of the respective cores 21 and 22 and in dependency on the common magnetomotive force which may be expressed in ampere turns and is registered or marked in the direction of the abscissæ. For every value of the magnetomotive force the flux of the core 22, since the reluctance of the magnetic circuit of which it forms a part is smaller than the reluctance of the magnetic circuit comprising core 21, will exceed the flux of the core 21. If, however, the flux on the two cores is to be of equal value, the core 22 may be influenced so as to have its flux decreased.

In Fig. 5, $\varphi_3$ represents a flux curve based on the flux $\varphi_2$ and the difference in magnetomotive force necessary to make the fluxes in cores 21 and 22 equal for any given magnetomotive force induced in core 22 by the excitation of the primary winding 18. Obviously, this differential magnetomotive force for normally maintaining a predetermined balance of the fluxes in cores 21 and 22 may be obtained in a variety of ways, one of which is shown in Fig. 4, where the core 22 is electrically coupled with an additional magnetic circuit comprising a core 26. The ratio of the turns on core 26 in circuit with the turns on core 22 may be such that the core 26 under the influence of the flux $\varphi_2$ of core 22 exerts a counter magnetomotive force proportional to this flux as indicated by the curve $\varphi_3$. In this way the flux $\varphi_2$ in core 22, by the choking effect of the magnetic member 26, is reduced and may be made equal to the flux $\varphi_1$ in core 21.

The fluxes $\varphi_1$, $\varphi_2$ of the cores 21, 22 may also be equalized by the arrangement shown in Fig. 6, although not with the accuracy obtained by the arrangement shown in Fig. 4, by electrically coupling the core 21 with a capacitance 27 from which the core 21 will receive the differential excitation required. If necessary, both of the flux balancing arrangements shown in Figs. 4 and 6 may be applied simultaneously.

What I claim as new and desire to secure by Letters Patent of the United States, is:—

1. A protective system of the class described, wherein a line conductor is composed of a plurality of conductor elements connected in parallel and lightly insulated from each other and wherein an electroresponsive device is to be affected upon the occurrence of a fault on said conductor characterized by the fact that a single transformer is provided at one end of said line conductor for creating a difference of potential between the elements thereof and for effecting the operation of said electroresponsive device, said transformer comprising a primary winding carrying all of the current to said conductor, an auxiliary winding arranged to produce a difference of potential between the elements of said conductor, and a secondary winding connected to said electroresponsive device and inductively coupled with said primary and auxiliary windings so that during normal operation substantially no current flows through said electroresponsive device and so that upon the occurrence of a fault a current is produced in said secondary winding to effect the operation of said electroresponsive device.

2. In a protective system of the class described, a plurality of conductors lightly insulated from each other, a transformer comprising a plurality of magnetic circuits, a primary winding on said transformer in common to two of said magnetic circuits connected to one of said conductors, a secondary winding on said transformer associated with one of said two magnetic circuits and an auxiliary winding on said transformer associated with one of said two magnetic circuits and connected to two other conductors of said plurality thereof and at an intermediate point to said one of said conductors, operative in response to the flux set up in its associated magnetic circuit by said primary winding to produce a difference of potential between any two of said conductors and in response to a breakdown of insulation between any two of said conductors to effect a change in the distribution of the fluxes in said two magnetic circuits whereby the electromotive force induced in said secondary winding is changed.

3. A protective system of the class described comprising a plurality of conductors lightly insulated from each other, means for controlling the circuit of said conductors, a transformer having a plurality of magnetic circuits, a primary winding on said transformer in common to two of said magnetic circuits connected to one of said conductors, a secondary winding on said transformer associated with one of said two magnetic circuits, an auxiliary winding on said transformer associated with one of said two magnetic circuits and connected to two other conductors of said plurality thereof and at an intermediate point to said one of said conductors operative in response to the flux set up in its associated magnetic circuit by said primary winding to produce a difference of potential between any two of said conductors and in response to a breakdown of insulation between any two of said conductors to effect a change in the distribution of the fluxes in said two magnetic circuits whereby the electromotive force induced in said secondary winding is changed, and electroresponsive means in circuit with said secondary winding operative in response to a change in the electromotive force induced therein to control said circuit controlling means.

4. In a protective system of the class described, a plurality of conductors lightly insulated from each other, a transformer having a plurality of legs, a primary winding on one of said legs for setting up a magnetic flux in each of a plurality thereof connected to one of said conductors, an auxiliary winding on another of said legs connected in circuit with two other conductors of said plurality thereof and at an intermediate point to said one of said conductors operative in response to the flux set up in said other leg by said primary winding to produce a difference of potential between said two other conductors and in response to a breakdown of insulation between any two of said plurality of conductors to effect a change in the distribution of the fluxes in said other leg and a third leg of said transformer, and a secondary winding comprising turns on the third leg of said transformer, whereby a change in the distribution of said fluxes will produce a change in the electromotive force induced in said secondary winding.

5. A protective system of the class described comprising a plurality of conductors lightly insulated from each other, means for controlling the circuit of said conductors, a transformer having a plurality of magnetic circuits, a primary winding on said transformer in common to two of said magnetic circuits connected to one of said conductors, a differentially wound secondary winding on said transformer comprising turns associated with each of said two magnetic circuits, an auxiliary winding on said transformer associated with one of said two magnetic circuits and connected to two other conductors of said plurality thereof and at an intermediate point to said one of said conductors, operative in response to the flux set up in its associated magnetic circuit by said primary winding to produce a difference of potential between any two of said conductors and in response to a breakdown of insulation between any two of said conductors to effect a change in the distribution of the fluxes in said two magnetic circuits whereby the resultant electromotive force induced in said differentially wound secondary winding is changed, and electroresponsive means in circuit with said secondary winding operative in response to a change in the electromotive force induced therein to control said circuit controlling means.

6. A protective system of the class described comprising a plurality of conductors lightly insulated from each other, means for controlling the circuit of said conductors, a transformer having a plurality of magnetic circuits, a primary winding on said transformer in common to two of said magnetic circuits connected to one of said conductors, means normally effective to maintain a predetermined distribution of the fluxes in said two magnetic circuits, a differentially wound secondary winding on said transformer comprising turns associated with each of said two magnetic circuits, an auxiliary winding on said transformer associated with one of said two magnetic circuits and connected to two other conductors of said plurality thereof and at an intermediate point to said one of said conductors, operative in response to the flux set up in its associated magnetic circuit by said primary winding to produce a difference of potential between any two of said conductors and in response to a breakdown of insulation between any two of said conductors to effect a change in the distribution of the fluxes in said two magnetic circuits whereby the resultant electromotive force induced in said differentially wound secondary winding is changed, and electroresponsive means in circuit with said secondary winding operative in response to a change in the electromotive force induced therein to control said circuit controlling means.

7. A protective system of the class described comprising a plurality of conductors lightly insulated from each other, means for controlling the circuit of said conductors, a transformer having a plurality of magnetic circuits, a primary winding on said transformer in common to two of said magnetic circuits connected to one of said conductors, means for exerting a magnetomotive force normally effective to maintain a predetermined distribution of the fluxes in said two magnetic circuits, a differentially wound secondary winding on said transformer comprising turns associated with each of said two magnetic circuits, an auxiliary winding on said transformer associated with one of said two magnetic circuits and connected to two other conductors of said plurality thereof and at an intermediate point to said one of said conductors, operative in response to the flux set up in its associated magnetic circuit by said primary winding to produce a difference of potential between any two of said conductors and in response to a breakdown of insulation between any two of said conductors to effect a change in the distribution of the fluxes in said two magnetic circuits whereby the resultant electromotive force induced in said differentially wound secondary winding is changed and electro-responsive means in circuit with said secondary winding operative in response to a change in the electromotive force induced therein to control said circuit controlling means.

In testimony whereof I affix my signature.

WILHELM PFANNKUCH.

Witnesses:
  E. SCHLEICHER,
  FRIEDA KLAIBER.